US006615886B2

United States Patent
Minami

(10) Patent No.: US 6,615,886 B2
(45) Date of Patent: Sep. 9, 2003

(54) VEHICLE TIRE INCLUDING BLOCKS AND OBLIQUE GROOVES

(75) Inventor: Nobuaki Minami, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/804,029

(22) Filed: Mar. 13, 2001

(65) Prior Publication Data

US 2002/0005236 A1 Jan. 17, 2002

(30) Foreign Application Priority Data

Mar. 13, 2000 (JP) .......................................... 2000-69038

(51) Int. Cl.[7] ...................... B60C 11/11; B60C 103/00; B60C 107/00; B60C 113/00
(52) U.S. Cl. .............................. 152/209.2; 152/209.18; 152/902
(58) Field of Search ........................ 152/209.2, 209.18, 152/209.28, 902; D12/592–603

(56) References Cited

U.S. PATENT DOCUMENTS

| 4,424,843 A | * | 1/1984 | Fontaine et al. |
| 5,178,699 A | * | 1/1993 | Kakumu et al. |
| 5,291,929 A | | 3/1994 | Daisho et al. |
| 5,526,860 A | * | 6/1996 | Minami |
| 6,129,127 A | * | 10/2000 | Nicotina |
| 6,311,748 B1 | * | 11/2001 | Boiocchi et al. |
| D458,214 S | * | 6/2002 | Takahashi et al. |

FOREIGN PATENT DOCUMENTS

| EP | 816130 | * | 1/1998 |
| EP | 0841198 A1 | | 5/1998 |
| EP | 0857588 A2 | | 8/1998 |
| JP | 61200007 | | 4/1986 |
| JP | 4-271905 | * | 9/1992 |

* cited by examiner

Primary Examiner—Steven D. Maki
(74) Attorney, Agent, or Firm—Birch, Stewart, Kolasch & Birch, LLP

(57) ABSTRACT

A vehicle tire comprises a central tread portion divided into central blocks B0 by central oblique grooves (g); a lateral tread portion divided into four kinds of blocks B1, B2, B3 and B4 by first and second oblique grooves (ga and gb) extending from a circumferential groove (G) to a tread edge, and cross oblique grooves (gc) extending between the first oblique grooves (ga1) while crossing the second oblique groove (gb); the central oblique grooves (g) and the cross oblique grooves (gc) inclined reversely to the first and second oblique grooves (ga and gb); the number of each of the first to fourth lateral blocks B1 to B4 in each of the lateral land portions being equal to the number of the central blocks B0; and each of the first oblique grooves (ga) and two of the cross oblique grooves (gc) meeting with at axially different positions (P1 and P2).

6 Claims, 4 Drawing Sheets

L: Large  S: Small

VEHICLE TIRE INCLUDING BLOCKS AND OBLIQUE GROOVES

FIELD OF THE INVENTION

The present invention relates to a pneumatic tire, more particularly to a block pattern having a specific groove arrangement being capable of improving noise during on-road running, while maintaining a good road grip during off-road running.

Usually, 4WD vehicles including Recreational Vehicles are equipped with radial tires designed for off-road use such as dirt roads, muddy roads, snowy roads and the like. However, 4WD vehicles especially Recreational Vehicles also have many opportunities to run on well paved roads such as highway, freeway and the like.

On the other hand, the tread pattern mostly used in the off-road tires is a block pattern made up of blocks divided by relatively wide grooves. In such a block pattern tire, as the space between the blocks is wide, steering stability and ride comfort especially noise performance under on-road conditions are not good.

The on-road performance may be improved if the grooved area in the tread is decreased, but, it deteriorates off-road performance, e.g. grip performance such as traction, braking and cornering grip, and discharge of mud, snow, etc. packed into the grooves.

It is therefore, an object of the present invention to provide a vehicle tire, in which on-road performance especially noise is improved without deteriorating off-road performance especially grip performance so as to be used under on-road conditions as well as off-road conditions.

SUMMARY OF THE INVENTION

According to the present invention, a vehicle tire comprises
- a tread provided with a circumferential groove (G) on each side of the tire equator to divide the tread into a central tread portion between the circumferential grooves and a lateral tread portion axially outside each of the circumferential grooves,
- the central tread portion divided into central blocks B0 by central oblique grooves (g) extending thereacross,
- the lateral tread portion provided with
  - first oblique grooves (ga) extending from the circumferential groove (G) to the tread edge,
  - second oblique grooves (gb) extending from the circumferential groove (G) to the tread edge without joining the first oblique grooves (ga) and alternating with the first oblique grooves (ga),
  - cross oblique groove (gc) each extending from one of the first oblique grooves (ga1) to the next first oblique groove (ga2) while crossing the second oblique groove (gb) therebetween,
- inclinations of the central oblique grooves (g) and the cross oblique grooves (gc) being reverse to inclinations of the first oblique grooves (ga) and the second oblique grooves (gb) with respect to the tire equator,
- whereby the lateral tread portion is divided into
  - first lateral blocks B1 defined as being surrounded by the circumferential groove (G), cross oblique groove (gc), second oblique groove (gb) and first oblique groove (ga1),
  - second lateral blocks B2 defined as being surrounded by the circumferential groove (G), cross oblique groove (gc), second oblique groove (gb) and first oblique groove (ga2),
  - third lateral blocks B3 defined as being surrounded by the cross oblique groove (gc), tread edge, second oblique groove (gb) and first oblique groove (ga1), and
  - fourth lateral blocks B4 defined as being surrounded by the cross oblique groove (gc), tread edge, second oblique groove (gb) and first oblique groove (ga2),
- the number of the first lateral blocks B1, the number of the second lateral blocks B2, the number of the third lateral blocks B3 and the number of the fourth lateral blocks B4 in each said lateral tread portion and the number of the central blocks B0 being equal to each other, and
- two of the cross oblique grooves (gc) meeting with one of the first oblique grooves (ga) at axially different positions.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
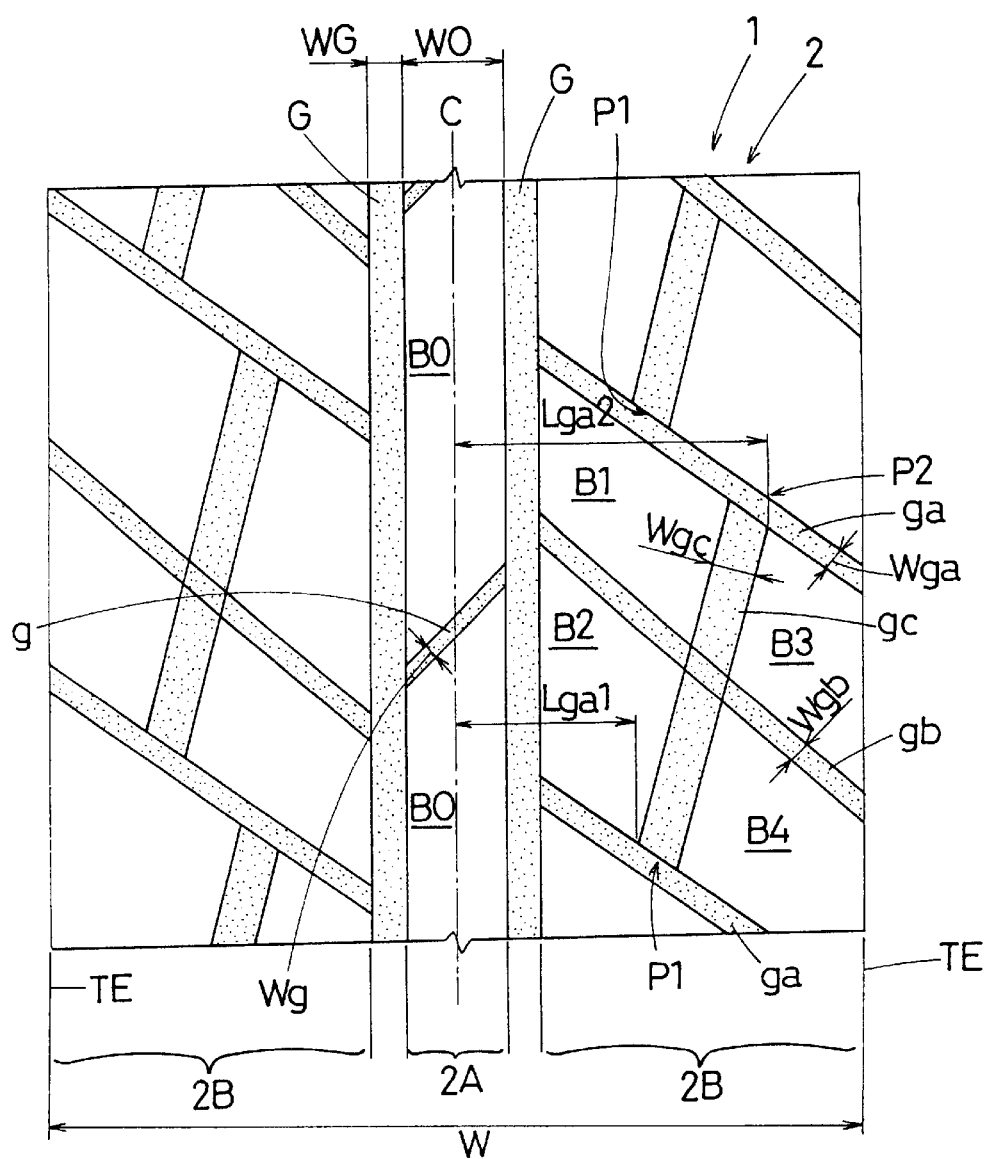
FIG. 1 is a developed plan view of a tire according to the present invention showing a simplified model of the tread pattern.
Figure 2:
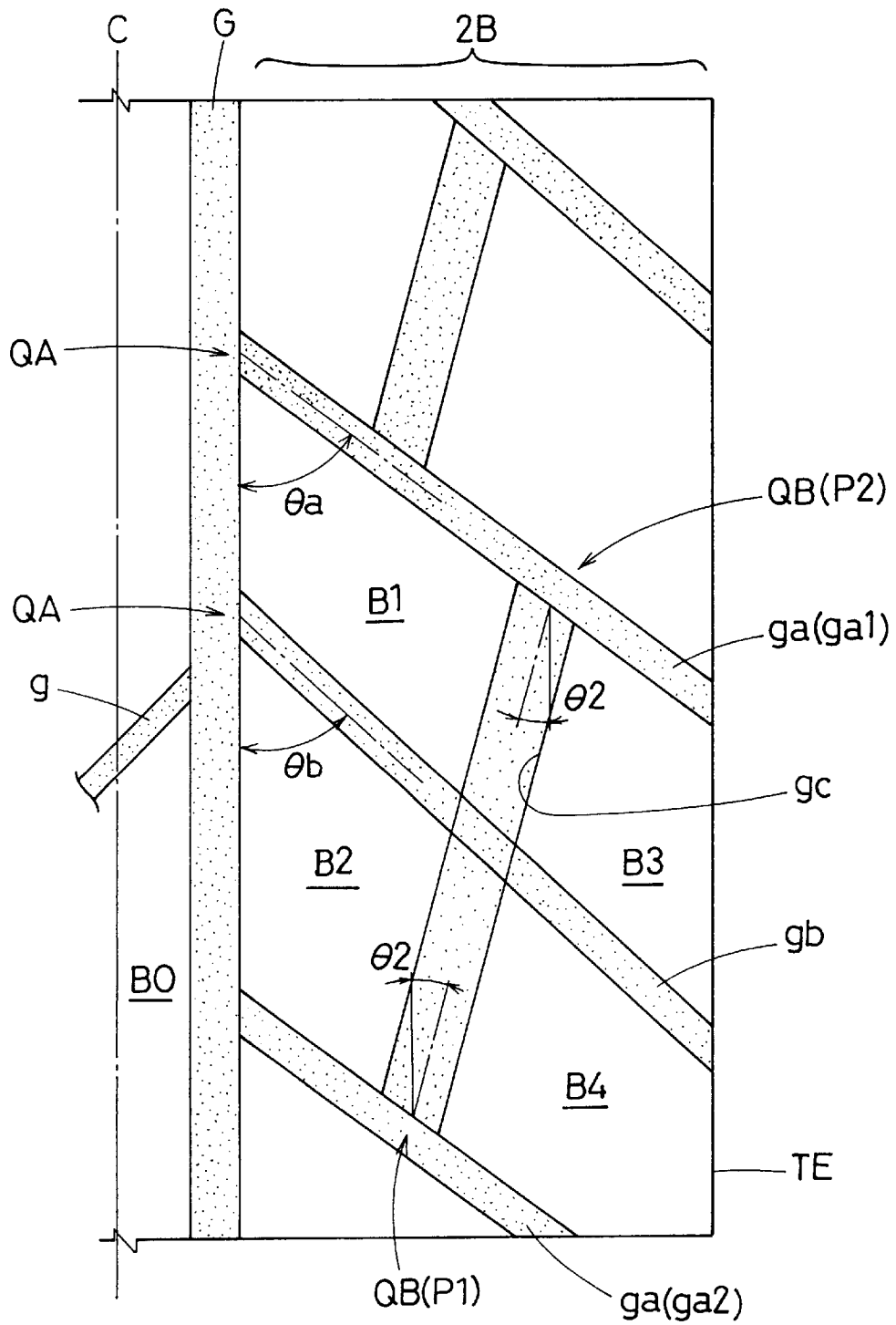
FIG. 2 is an enlarged partial plan view thereof.

In the drawings, pneumatic radial tire 1 according to the present invention comprises a tread portion 2 which is provided on each side of the tire equator C with a circumferential groove (G) so as to divide the ground contacting region into a central tread portion 2A between the circumferential grooves (G) and two lateral land portions 2B each formed between one of the circumferential grooves (G) and the adjacent tread edge TE.

Here, the tread edges E are the axial outermost edges E of the ground contacting region under such a condition that the tire is mounted on its standard rim and inflated to its standard pressure, and then loaded with a standard load. The standard rim is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. The standard load is the "maximum load capacity" in JATMA, the "Load Capacity" in ETRTO, the maximum value given in the above-mentioned table in T&RA or the like. In case of passenger car tires, however, 180 kPa is used as the standard pressure, and 88% of the maximum load is used.

The circumferential grooves (G) are located near the tire equator C such that the axial distance of the center line of the circumferential groove (G) from the tire equator C is in a range of not more than 0.15 times the ground contacting width W.

The central tread portion 2A is crossed by central oblique grooves (g) which extend from one of the circumferential grooves (G) to the other while inclining in one direction with respect to the circumferential direction, whereby the central tread portion 2A is divided into central blocks B0 of which circumferential length is more than its axial width W0.

The lateral land portions 2B are provided with first oblique grooves (ga), second oblique grooves (gb) and cross oblique grooves (gc) to divide into four kinds of lateral blocks, namely, first to fourth lateral blocks B1 to B4.

The first to fourth lateral blocks B1 to B4 have different shapes each of which is generally regarded as a trapezoid as shown in FIG. 1.

The first oblique grooves (ga) extend from the circumferential grooves (G) to the tread edges TE, while inclining, with respect to the circumferential direction, reversely to the inclination of the central oblique grooves (g).

The second oblique grooves (gb) extend from the circumferential grooves (G) to the tread edges TE, while inclining, with respect to the circumferential direction, reversely to the inclination of the central oblique grooves (g).

The first oblique grooves (ga) and second oblique grooves (gb) are alternated in the circumferential direction and do not join each other.

The cross oblique grooves (gc) extend between the circumferentially adjacent first oblique grooves, each starting from one of them (ga1) and ending at the adjacent one (ga2), thus crossing one of the second oblique grooves (gb) therebetween. The cross oblique grooves (gc) are accordingly inclined reversely to the first and second oblique grooves. In FIG. 1, all the cross oblique groove (gc) are inclined in the same direction.

Each of the first oblique grooves (ga) is connected with two cross oblique grooves (gc) at two different points P1 and P2.

In FIG. 1, the inclinations of the cross oblique grooves (gc) and the central oblique grooves (g) are right-side upward, and the inclinations of the first and second oblique grooves (ga and gb) are left-side upward. Of course these inclinations can be reversed.

The first lateral blocks B1 is defined by the surrounding adjacent circumferential groove (G), cross oblique groove (gc), second oblique groove (gb) and first oblique groove (ga1). The second lateral blocks B2 is defined by the surrounding adjacent circumferential groove (G), cross oblique groove (gc), second oblique groove (gb) and first oblique groove (ga2). The third lateral blocks B3 is defined by the surrounding adjacent cross oblique groove (gc), tread edge TE, second oblique groove (gb) and first oblique groove (ga1). The fourth lateral blocks B4 is defined by the surrounding adjacent cross oblique groove (gc), tread edge TE, second oblique groove (gb) and first oblique groove (ga2).

The number NB0 of the central block B0, and the numbers NB1, NB2, NB3 and NB4 of the first to fourth lateral blocks B1, B2, B3 and B4 in each lateral land portions 2B are the same, thus, the following relation is satisfied: NB0=NB1=NB2=NB3=NB4.

The widths WG, Wg, Wga, Wgb, Wgc of the circumferential groove G, central oblique groove (g), first and second oblique grooves (ga, gb) and cross oblique groove (gc) are not less than 0.02 times the ground contacting width W. These grooves (G, g, ga, gb, gc) are so defined as having a width within this range.

Figure 4:
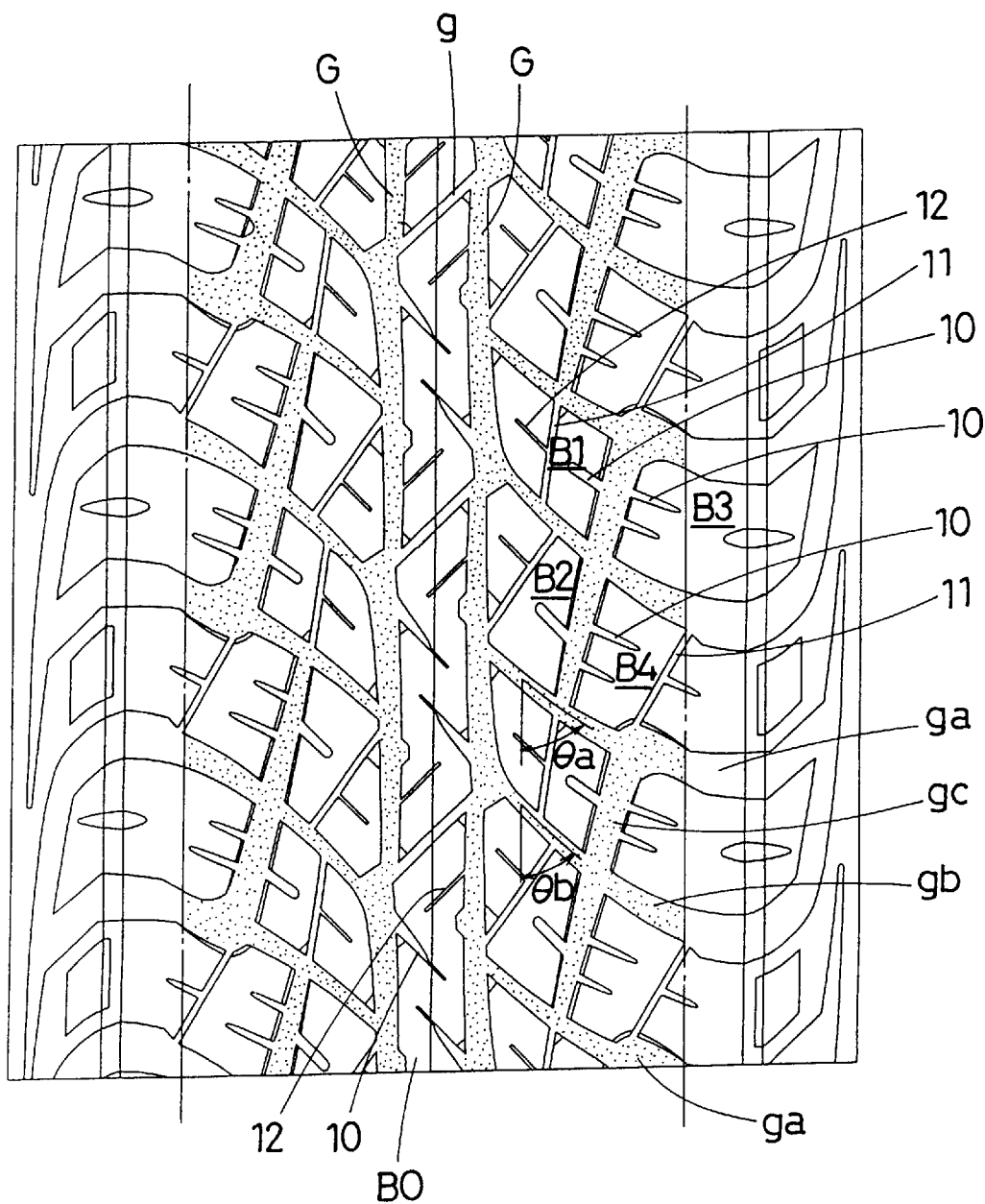
FIG. 4 is a developed plan view of a tire according to the present invention showing a more practical example of the tread pattern.

No groove other than these grooves (G, g, ga, gb, gc) has a width within this range. Here, the groove means one having open ends. Thus, as shown in FIG. 4, a blind groove 10 at least one end of which terminates within the block can be provided even if the width is not less than 0.02×W. Also it is possible to provide a narrow groove 11 having a width less than 0.02×W inclusive of a sipe 12 having no substantial groove width.

With respect to the rubber volume, the relation of the first to fourth lateral blocks B1 to B4 is B1>B2 and B3<B4 so that the block rigidity has the same relation

B1>B2 and B3<B4.

Figure 3:
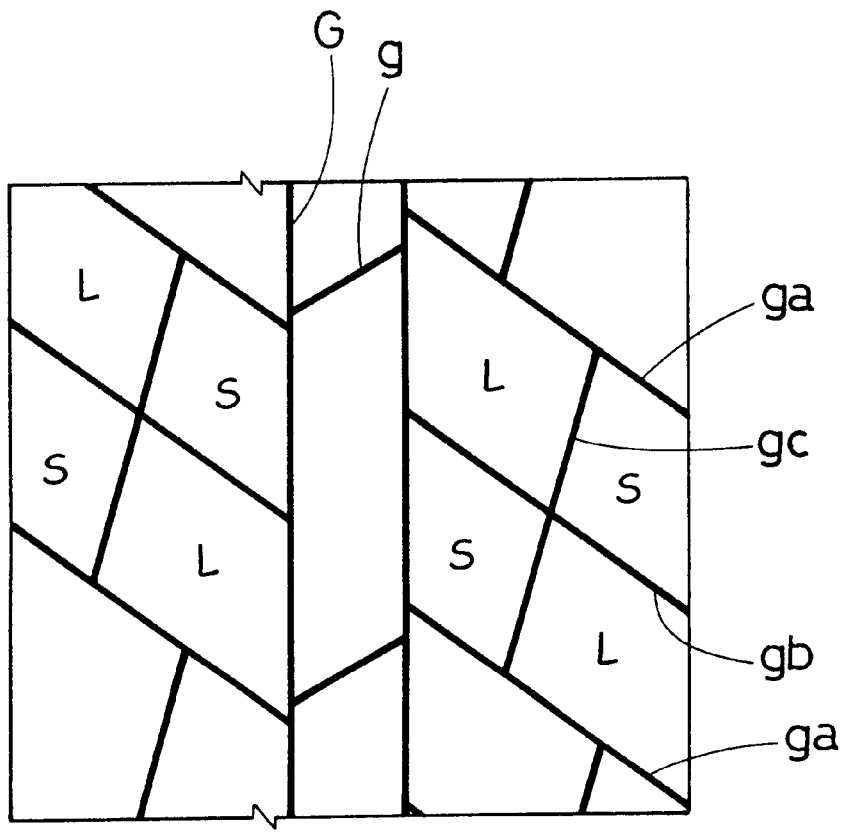
FIG. 3 is a diagram for explaining the block arrangement.

Therefore, as shown in FIG. 3, in each lateral tread portion, the blocks B1 and B4 which are larger in volume than the blocks B2 and B3 are staggered. As a result, the rigidity of the tread portion can be improved and evened as a whole.

It is preferable that the angles θa and θb of the first and second oblique grooves (ga and gb) are in a range of from 35 to 65 degrees with respect to the tire circumferential direction when measured at the circumferential groove (G), namely, at the junction QA therebetween. Accordingly, the intersecting angle is 35 to 65 degrees.

It is preferable that the angle θ2 of the cross oblique groove (gc) is in a range of 8 to 22 degrees with respect to the tire circumferential direction when measured at the first and second oblique grooves (ga, gb), namely, at the junction QB therebetween. Accordingly, the intersecting angle is 8 to 22 degrees.

The angles θa, θb, θ2 can be defined as of the groove center line to the tire circumferential direction.

If the angle θa is less than 35 degrees, the angle θb is less than 35 degrees, and/or the angle θ2 is less than 8 degrees, off-road grip tends to decrease. If the angle θa is more than 65 degrees, the angle θb is more than 65 degrees and/or the angle θ2 is more than 22 degrees, on-road noise performance tends to deteriorate.

According to the invention, all the grooves other than the two circumferential grooves (G) are oblique. Therefore, the ground contact of each block edge or groove edge during running is gradual, and the vibration due to the ground contact is effectively minimized. Further, as the circumferential grooves are kept away from the tread edges, the noise due to air resonance sound and pumping sound from circumferential grooves can be reduced.

Preferably, the axial width WB of the central block B0 is set in a range of from 0.1 to 0.2 times the ground contacting width W.

Preferably, the above-mentioned groove widths WG, Wg, Wga, Wgb and Wgc are set in a range of from 0.02 to 0.08 times the ground contacting width W.

If the block width W0 is less than 0.1XW, off-road performance, such as grip, especially traction decreases. If the block width W0 is more than 0.2XW, ride comfort and noise performance tend to deteriorate.

If the groove widths WG, Wg, Wga, Wgb, Wgc are less than 0.02XW, off-road performance such as grip decreases. If more than 0.08XW, noise tends to increase.

It is preferable for improving wet performance that the widths Wgc, Wga and Wgb of the cross oblique groove (gc), first oblique groove (ga) and second oblique groove (gb) gradually increase towards the axially outside of the tire. In this case too, it is preferable to limit the groove widths Wgc, Wga, Wgb to not more than 0.08XW.

As to the junctions P1 and P2 of each first oblique groove (ga) and two cross oblique grooves (gc), it is preferable that (i) in the axially inward junction P1, the axial distance Lga1 from the tire equator C to the axially inward corner, as shown in FIG. 1, is in a range of from 0.15 to 0.30 times the ground contacting width W, and (ii) in the axially outward junction P2, the axial distance Lga2 from the tire equator C to the axially outward corner is in a range of from 0.30 to 0.45 times the ground contacting width W.

If the distance Lga1 is less than 0.15XW or more than 0.30XW and/or the distance Lga2 is less than 0.30XW or more than 0.45XW, off-road performance especially grip performance decreases.

FIG. 4 shows a preferred embodiment of the tread pattern.

In this example, the circumferential groove (G) extends substantially straight, presenting a groove width WG having cyclic ups and downs in the tire circumferential direction. In this example, this cyclic change is brought about by a cyclic change of the inclination of the axially outer edge of the groove. The axially inner edge of the groove G is aligned. A zigzag groove may be used for the circumferential groove (G). But, a zigzag groove having a large zigzag amplitude is not preferable in view of discharging mud and snow.

The first and second oblique grooves (ga, gb) are curved such that the angles $\theta a$, $\theta b$ gradually increase from the circumferential groove G to the tread edge TE, whereby the resistance to water flow for drainage can be decreased.

Further, the first and second oblique grooves (ga, gb) and cross oblique groove (gc) are increased in the widths Wga, Wgb, Wgc from the circumferential groove G to the tread edge TE in order to improve the wet performance.

Each of the central blocks B0 is provided with two narrow blind grooves 10 and two zero-width sipes 12 each obliquely extending from the edges of the central block B0 towards the tire equator C and terminating near the tire equator C, wherein each blind groove 10 is aligned with one of the second oblique grooves (gb), and each sipes 12 is disposed adjacently to and parallel with one of the central oblique grooves (g).

Each of the first and second lateral blocks B1 and B2 is provided with a narrow and shallow groove 11 extending thereacross to subdivide the block into two axially outer and inner parts, a blind groove 10 extending axially inwards from the cross oblique groove (gc), and a sipe 12 extending axially inwards from the groove 11.

Each of the third lateral blocks B3 is provided with blind grooves 10 extending axially outwards from the cross oblique groove (gc).

Each of the fourth lateral blocks B4 is provided with a narrow and shallow groove 11 extending thereacross to subdivide the block into two axially outer and inner parts, and a blind groove 10 extending axially outwards from the groove 11.

Comparison Tests

Test tires of size 265/70R16 having the tread pattern shown in FIG. 4 and the specifications given in Table 1 were made and tested for on-road performance and off-road performance.

1) On-road Performance

Steering stability test: A test car (Japanese 3000cc 4WD car) provided on all the four wheels with test tires (Wheel rim size: 7JX16, Inner pressure: 200 kPa) was run on the dry asphalt road in a tire test course. Based on the handle response, rigidity, grip, etc., the test driver evaluated the steering stability. The test results are indicated in Table 1 by an index based on Ref. tire 1 being 100. The larger the index, the better the steering stability.

Noise test: The test car was coasted on a smooth asphalt road at a speed of 50 km/h, and the overall noise level in dB(A) was measured near a driver's ear on the inside of the car. The test results are indicated in Table 1 by an index based on Ref. tire 1 being 100. The smaller the index, the better the nose.

Ride comfort test: The test car was run on dry rough roads (including asphalt road, stone-paved road and graveled road) and the test driver evaluated the ride comfort, based on harshness, damping, thrust-up, etc. The test results are indicated in Table 1 by an index based on Ref. tire 1 being 100. The larger the index, the better the ride comfort.

Wet performance test: The test car was run on a wet asphalt road provided with a 10 millimeter depth 20 meter long water pool along a 100 meter radius circle, and the lateral acceleration (lateral-G) when entered into the water pool was measured, increasing the entering speed to obtain the average lateral-G in a speed range of from 50 to 80 km/hr. The test results are indicated in Table 1 by an index based on Ref. tire 1 being 100. The larger the index, the better the wet performance.

2) Off-road Performance

Grip test: On a muddy road in the tire test course, the time for running 30 meters was measured starting the test car from zero speed at full acceleration in the "D" range of the an automatic transmission. The test results are indicated in Table 1 by an index based on Ref. tire 1 being 100. The larger the index, the better the off-road grip performance.

TABLE 1

| Tire<br>Tread pattern | Ex. 1<br>FIG. 4 | Ex. 2<br>FIG. 4 | Ex. 3<br>FIG. 4 | Ex. 4<br>FIG. 4 | Ex. 5<br>FIG. 4 | Ref. 1<br>FIG. 4 |
|---|---|---|---|---|---|---|
| Tread width W (mm) | 178 | 178 | 178 | 178 | 178 | 178 |
| W0/W | 0.12 | 0.12 | 0.12 | 0.08 | 0.22 | 0.12 |
| Block number | | | | | | |
| NB0 | 24 | 24 | 24 | 24 | 24 | 48 |
| NB1, NB2, NB3 & NB4 | 24 | 24 | 24 | 24 | 24 | 24 |
| Groove inclination | | | | | | |
| angle $\theta a$ (deg.) | 55 | 55 | 55 | 55 | 55 | 55 |
| angle $\theta b$ (deg.) | 46 | 46 | 46 | 46 | 46 | 46 |
| angle $\theta 2$ (deg.) | 14 | 25 | 7 | 14 | 14 | 14 |
| Groove width | | | | | | |
| WG/W | 0.04 | 0.04 | 0.04 | 0.04 | 0.04 | 0.04 |
| Wg/W | 0.02 | 0.02 | 0.02 | 0.02 | 0.02 | 0.02 |
| Wga/W | 0.06 | 0.06 | 0.06 | 0.06 | 0.06 | 0.06 |
| Wgb/W | 0.06 | 0.06 | 0.06 | 0.06 | 0.06 | 0.06 |
| Wgc/W | 0.07 | 0.07 | 0.07 | 0.07 | 0.07 | 0.07 |
| Junction distance | | | | | | |
| Lga1/W | 0.23 | 0.23 | 0.23 | 0.23 | 0.23 | 0.23 |
| Lga2/W | 0.39 | 0.39 | 0.39 | 0.39 | 0.39 | 0.39 |
| On-road performance | | | | | | |
| Noise | 98 | 85 | 100 | 95 | 90 | 100 |
| Steering stability | 110 | 105 | 105 | 95 | 105 | 100 |
| Ride comfort | 98 | 95 | 90 | 85 | 90 | 100 |
| Wet performance | 98 | 93 | 93 | 93 | 90 | 100 |
| Off-road performance | | | | | | |
| Road grip | 110 | 105 | 95 | 95 | 105 | 100 |

The present invention can be suitably applied to radial tires for 4WD vehicles, recreational vehicles and the like used under on-road conditions as well as off-road conditions.

What is claimed is:

1. A vehicle tire comprising
a tread provided with a circumferential groove (G) on each side of the tire equator to divide the tread into a central tread portion between the circumferential grooves and a lateral tread portion axially outside each said circumferential groove,
said central tread portion divided into central blocks B0 by substantially straight central oblique grooves (g) extending thereacross,
said lateral tread portion provided with
first oblique grooves (ga) extending from the circumferential groove (G) to the tread edge, second oblique grooves (gb) extending from the circumferential groove (G) to the tread edge without joining the first oblique grooves (ga) and alternating with the first oblique grooves (ga), cross oblique grooves (gc) each extending from one of the first oblique grooves (ga1) to the next first oblique groove (ga2) while crossing the second oblique groove (gb) therebetween, inclinations of the central oblique grooves (g) and the cross oblique grooves (gc) being reverse to inclinations of the first oblique grooves (ga) and the second oblique grooves (gb) with respect to the tire equator, whereby the lateral tread portion is divided into first lateral blocks B1 each defined as being surrounded by the circumferential groove (G), cross oblique groove (gc), second oblique groove (gb) and first oblique groove (ga1), second lateral blocks B2 each defined as being surrounded by the circumferential groove (G), cross oblique groove (gc), second oblique groove (gb) and first oblique groove (ga2), third lateral blocks B3 each defined as being surrounded by the cross oblique groove (gc), tread edge, second oblique groove (gb) and first oblique groove (ga1), and fourth lateral blocks B4 each defined as being surrounded by the cross oblique groove (gc), tread edge, second oblique groove (gb) and first oblique groove (ga2), the number of the first lateral blocks B1, the number of the second lateral blocks B2, the number of the third lateral blocks B3 and the number of the fourth lateral blocks B4 in each said lateral tread portion and the number of the central blocks B0 being equal to each other, and two of the cross oblique grooves (gc) meeting with one of said first oblique grooves (ga) at axially different positions.

2. The vehicle tire according to claim 1, wherein the angle $\theta a$ of each said first oblique groove (ga) and the angle $\theta b$ of each said second oblique groove (gb) are in a range of from 35 to 65 degrees with respect to the tire circumferential direction when measured at the meeting point with the circumferential groove (G), and the angle $\theta 2$ of each said cross oblique groove (gc) is in a range of from 8 to 22 degrees with respect to the tire circumferential direction when measured at the meeting point with each of the first and second oblique grooves (ga) and (gb).

3. The vehicle tire according to claim 1 or 2, wherein the axial width W0 of the central blocks B0 is in a range of from 0.1 to 0.2 times the ground contacting width W, the width WG of the circumferential grooves (G), the width Wg of the central oblique grooves (g), the width Wga of the first oblique grooves (ga), the width Wgb of the second oblique grooves (gb) and the width Wgc of the cross oblique grooves (gc) are in a range of from 0.02 to 0.08 times the ground contacting width W, the first oblique groove (ga), the second oblique groove (gb) and the cross oblique groove (gc) are increased in width towards the axially outside of the tire.

4. The vehicle tire according to claim 1, wherein as to the two meeting points of the two cross oblique grooves (gc) with each said first oblique groove (ga), the axial distance Lga1 from the tire equator to an axially inward corner at the axially inner meeting point is in a range of from 0.15 to 0.30 times the ground contacting width W, and the axial distance Lga2 from the tire equator to an axially outward corner at the axially outer meeting point is in a range of from 0.30 to 0.45 times the ground contacting width W.

5. The vehicle tire according to claim 1, wherein in each said lateral tread portion, lateral blocks (B1 and B4) being larger in volume than the axially adjacent blocks (B2 and B4) are staggered along the tire circumferential diredtion.

6. The vehicle tire according to claim 1, wherein the width of each of the cross oblique grooves (gc) gradually increases axially outwards of the tire.

* * * * *